(12) United States Patent
Bauer et al.

(10) Patent No.: US 7,302,485 B2
(45) Date of Patent: Nov. 27, 2007

(54) SYSTEM AND METHOD FOR TRANSMITTING OPC DATA VIA DATA NETWORKS, IN PARTICULAR THE INTERNET, USING AN ASYNCHRONOUS DATA CONNECTION

(75) Inventors: Thomas Bauer, Stutensee (DE); Roland Heymann, Erlangen (DE); Heinz-Christoph Schmolka, Graben-Neudorf (DE); Marcus Sebald, Erlangen (DE); Thomas Talanis, Heroldsbach (DE); Frank Volkmann, Nürnberg (DE)

(73) Assignee: Siemens Aktiengesellschaft, Munich (DE)

( * ) Notice: Subject to any disclaimer, the term of this patent is extended or adjusted under 35 U.S.C. 154(b) by 954 days.

(21) Appl. No.: 10/343,639

(22) PCT Filed: Jul. 27, 2001

(86) PCT No.: PCT/DE01/02858

§ 371 (c)(1),
(2), (4) Date: Feb. 3, 2003

(87) PCT Pub. No.: WO02/13482

PCT Pub. Date: Feb. 14, 2002

(65) Prior Publication Data

US 2004/0073680 A1    Apr. 15, 2004

(51) Int. Cl.
*G06F 15/16*    (2006.01)
(52) U.S. Cl. ............... 709/227; 709/203; 709/225; 709/230; 709/237

(58) Field of Classification Search ................. 709/203, 709/225, 227–232, 237
See application file for complete search history.

(56) References Cited

U.S. PATENT DOCUMENTS 5,796,393 A    8/1998    MacNaughton et al.

(Continued)

FOREIGN PATENT DOCUMENTS

DE    199 04 331 C1    8/2000

(Continued)

OTHER PUBLICATIONS

Spreitzer et al., "HTTP 'Next Generation'", Ninth World Wide Web Conference, Amsterdam, Netherlands, May 15-19, 2000, Online vol. 33, No. 1-6, pp. 593-607.

(Continued)

*Primary Examiner*—Phuoc Nguyen
(74) *Attorney, Agent, or Firm*—Staas & Halsey LLP

(57) ABSTRACT

OPC data is transmitted via data networks, in particular the Internet. A bi-directional data connection via the Internet in both directions is enabled even across firewalls and starting from an OPC client, which is not visible as a server on the Internet. To achieve this, a first connection request for establishing a first transmission channel is sent from a first data processing device of an OPC client, via a data connection, to an OPC server of an automation system. The OPC server responds to the request using a second transmission channel. The data connection is thus kept open permanently, allowing data to be sent and received bi-permanently, allowing data to be sent and received bi-directionally, the operations being temporally independent of each other, between the OPC client and the OPC server by at least one data network, in particular, the Internet.

23 Claims, 3 Drawing Sheets

U.S. PATENT DOCUMENTS

| | | | |
|---|---|---|---|
| 6,020,884 A | | 2/2000 | MacNaughton et al. |
| 7,003,558 B2* | | 2/2006 | Agrusa et al. ............... 709/223 |
| 2001/0047420 A1 | | 11/2001 | Talanis et al. |
| 2003/0233399 A1* | | 12/2003 | Prohel et al. ............... 709/201 |
| 2004/0073680 A1* | | 4/2004 | Bauer et al. ............... 709/227 |

FOREIGN PATENT DOCUMENTS

| | | |
|---|---|---|
| DE | 101 12 843 A1 | 9/2001 |
| JP | 11-327630 | 11/1999 |
| JP | 2000-181528 | 6/2000 |

OTHER PUBLICATIONS

Martin-Flatin et al., "JAMAP: a Web-Based Management Platform for IP Networks", in Stadler et al., *Active Technologies for Network and Service Management-Proc. 10th IFIP/IEEE International Workshop on Distributed Systems: Operations & Management (DSOM '99)*, Zurich, Switzerland, Oct. 1999, LNCS 1700: pp. 164-178, Springer, Berlin, Germany, 1999.

Himstedt et al., "OPC-OLE for Process Control", Electronik, Franzis Verlag GmbH, Munich, Germany, vol. 46, Co. 7, Jan. 4, 1997, pp. 56-58 and 60 (filed with English language translation).

Nakajima et al., "A real Time Sharing System for Multi-Media Data in the Internet", Multimedia, Distributed, Cooperative and Mobile Symposium (DICOMO 2000) published by IPSJ (Internet Processing Society of Japan), Symposium Series vol. 2000, No. 7 (Jun. 28, 2000), pp. 265-270.

Japanese Office Action for Application No. 2002-518712 issued on Jan. 5, 2006.

\* cited by examiner

SYSTEM AND METHOD FOR TRANSMITTING OPC DATA VIA DATA NETWORKS, IN PARTICULAR THE INTERNET, USING AN ASYNCHRONOUS DATA CONNECTION

CROSS REFERENCE TO RELATED APPLICATIONS

This application is based on and hereby claims priority to PCT Application No. PCT/DE01/02858 filed on 27 Jul. 2001 and German Application No. 100 38 552.4 filed on 3 Aug. 2000, the contents of which are hereby incorporated by reference.

BACKGROUND OF THE INVENTION

The invention relates to a system and a method for transmitting OPC data via data networks, in particular the Internet, using an asynchronous data connection.

OPC (OLE for process control) is understood to mean a standard and manufacturer-independent specification of a software interface between Windows applications and automation systems, in particular for production control and automation, which permits the flow of data between an extremely wide range of systems, applications and devices without problems. OPC therefore represents a connection among process control, statistical production control, process optimization, other production applications, for example applications for carrying out production or for the production management, the corresponding real-time devices and Windows applications. For this purpose, it offers a series of OLE or COM-based standard interfaces and further adapted interfaces.

With the aid of data networks, it is possible to establish a data connection to a server from any desired computers, clients, as they are known, which have access to these data networks. This applies in particular to the World Wide Web (WWW), which is also called the Internet. The terms Web or Internet server or Web or Internet client, used in the following text, are used to illustrate the membership to the specific data network comprising the Internet, but in functional terms make no distinction from the meaning of the terms client and server which are used for all possible data networks. In the following text, the terms OPC client and OPC server will be understand to mean those computers which can additionally process data in the OPC data format. In the following text, when only the term client or server is used, this is understood to mean an OPC client or OPC server.

In the Internet, a data connection is established to what is known as a Web or Internet server. The access to an Internet server is carried out, for example, with the aid of known Internet browsers, for example Internet Explorer from Microsoft or Netscape Communicator from Netscape. When a data connection is being established from a Web or Internet client, as they are known, a request is output to an Internet server by entering and dispatching what is known as a URL address. When a data connection is established, the Internet server called answers with what is known as an HTML page (HTML=Hyper Text Markup Language), also called a Web page. The Web clients, as they are known, communicate with the Web servers by transport protocols. Each data connection between Web client and Web server is therefore based on a request protocol and, as a reaction to this, a response protocol.

Internet connections permit fast data interchange between locations which are physically widely separated. In conjunction with the OPC technology, it is thus possible for extremely different systems, applications and devices which can be located physically very widely removed from one another, to communicate with one another simply and quickly. Until now, however, it has not been possible to connect the full functional scope of the OPC technology to the Internet, since for this purpose an asynchronous data transmission method, that is to say time-independent, bidirectional communication, would be necessary, which has hitherto not been possible in the Internet.

SUMMARY OF THE INVENTION

One aspect of the invention is based on the object of specifying a system and a method for transmitting OPC data via data networks, in particular the Internet, which permits time-independent, bidirectional transmission of OPC data even between at least two data processing devices that can be coupled to data networks, in particular the Internet, even behind data protection devices, in particular fire walls, even if one of the data processing devices is not visible in the data network, in particular the Internet.

This object may be achieved by a method for transmitting OPC data via data networks, in particular the Internet, in which a first connection request for establishing at least one first transmission channel is sent from an OPC client via a data connection to at least one OPC server, at least one data connection, in particular a transmission channel, being permanently open, which is provided for sending, at any desired time and independently of the actions of the OPC client, OPC data from at least one OPC server to the OPC client via at least one data network.

The object may be achieved by a system for transmitting OPC data via data networks, in particular the Internet, comprising at least one data processing device that can be coupled to a data network and belongs to an OPC client, the first data processing device being provided to establish at least one data connection in the form of a first transmission channel to at least one OPC server, at least one data connection, in particular a transmission channel, being permanently open, which is provided for sending, at any desired time and independently of the actions of the OPC client, OPC data from at least one OPC server to the OPC client via at least one data network.

One aspect of the invention is based on the finding that, with the aid of the Internet, a true "active" data connection to a client that is not visible in the Internet, in particular an OPC client, is not possible, but only a data connection between any desired client connected to the Internet with any desired server that is visible in the Internet, in particular an OPC server. This disadvantage is overcome in a surprisingly simple way in that first of all a first transmission channel from the client to the server of an automation system is established. For this purpose, from the client which, after the production of the bidirectional data connections, can serve as a fully adequate operating and observation system for the automation system, a first connection request is sent to the server of the automation system. The server answers this connection request and, in order to keep this data connection open permanently, the Internet server, for example even when there is no useful data present, in particular useful OPC data, transmits dummy data to the client or sends information to the client which informs the client that a transmission of useful data is still intended. In this case, dummy data is data which is generated by the server itself for the purpose of maintaining the data connection and is sent to the client.

In this way, a permanently open data connection is installed, via which the server, in particular an OPC server and therefore the automation system, can at any time and independently of actions of the client, in particular an OPC client, send data, in particular OPC data, asynchronously to the client and therefore to the O&O system.

Independently of and in parallel with this, client and server can also communicate with one another conventionally in the Internet, by the client in each case directing a new request to the server, which is answered by the latter with an appropriate response.

A system of mutually independent data connections is therefore available, by which both the client, that is to say the O&O system, and also the automation system for itself can communicate with one another. Between client and server or, in other words, between operating and observation system and automation system, in functional terms a bidirectional data connection is ensured which, in particular, also permits data transmission from the server to the client, since the server is continuously connected to the client via a transmission channel that is permanently open, so that chronologically mutually independent bidirectional data transmission in both directions between client and server is made possible. A data connection of this type is particularly suitable for the operation and observation of an automation system, it being possible for the client to function as an operating and observation system, which can be activated from any desired computer connected to the Internet. As opposed to known Internet data connections, the result is therefore an asynchronous data transmission method which does not require of the client the necessity to be visible in the Internet or to have installed what is known as a Web server (IIS=Internet Information Server). This makes it possible, from any desired location in the world, in front of and behind data protection devices, in particular firewalls, to establish a bidirectional data connection to a server. Since the data connection is activated from the client, that is to say from the O&O system, it is not necessary for the server to actively establish a data connection to the client. Furthermore, a change in the configuration of the client is not required either.

Permanent maintenance of a data connection can be ensured by dummy data being transmitted in order to maintain at least one transmission channel, even when there is no useful data present.

A particularly advantageous refinement is characterized in that the dummy data is sent from the server to the client. In this case, it has proven to be particularly advantageous if, when useful data is not present, dummy data is sent from the server to the client every 25-35 seconds, in order to keep the data connection open.

A further advantageous refinement is characterized in that in order to maintain a permanent data connection, in particular a transmission channel between server and client, the server sends the client information which informs the client that a transmission of data is intended.

A further advantageous refinement is characterized in that in order to maintain a data connection, in particular a transmission channel, permanently, via which quantitative data up to a defined size is transmitted from the OPC server to the OPC client, a requirement for a new connection request is sent from the OPC server to the OPC client before the defined quantity of data is reached, and then a new connection request for establishing at least one new transmission channel is sent from the OPC client to the OPC server. A size of 15-25 MB for the quantities of data to be transmitted via a transmission channel has proven to be very advantageous, since this improves the performance and the response times of the system to an extraordinary extent because of the communication via firewall computers, and therefore the cost/benefit ratio is most effective.

A further advantageous refinement is characterized in that a transport protocol, in particular an Internet transport protocol, is provided to control the data transmission. In this case, the use of the Hypertext Transport Protocol (HTTP) as the transport protocol has proven to be particularly advantageous, since its application is extraordinarily simple and the effort for adaptation is very low.

A particularly advantageous application, using the existing infrastructures, in particular Internet infrastructures, for a bidirectional data transmission, relates to the method of operating and observing an automation system, for example, being provided via at least one data network, in particular via the Internet, since as a result, for example, remote diagnoses can be implemented very simply, as a result of which the analysis of faults which occur and their rectification in continuous operation of automation systems, for example, can be carried out cost-effectively at locations physically far removed from one another.

A further advantageous refinement is characterized in that the client does not have to be visible in the Internet, nor have to have installed an Internet Information Server (IIS).

A connection between the automation and communication technology can be configured in a simple way in that the operating and observation system of the client initiates the provision of at least one transmission channel as a distributed object, in particular as a DCOM object, and that the connection to the automation system is established via a DCOM server.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
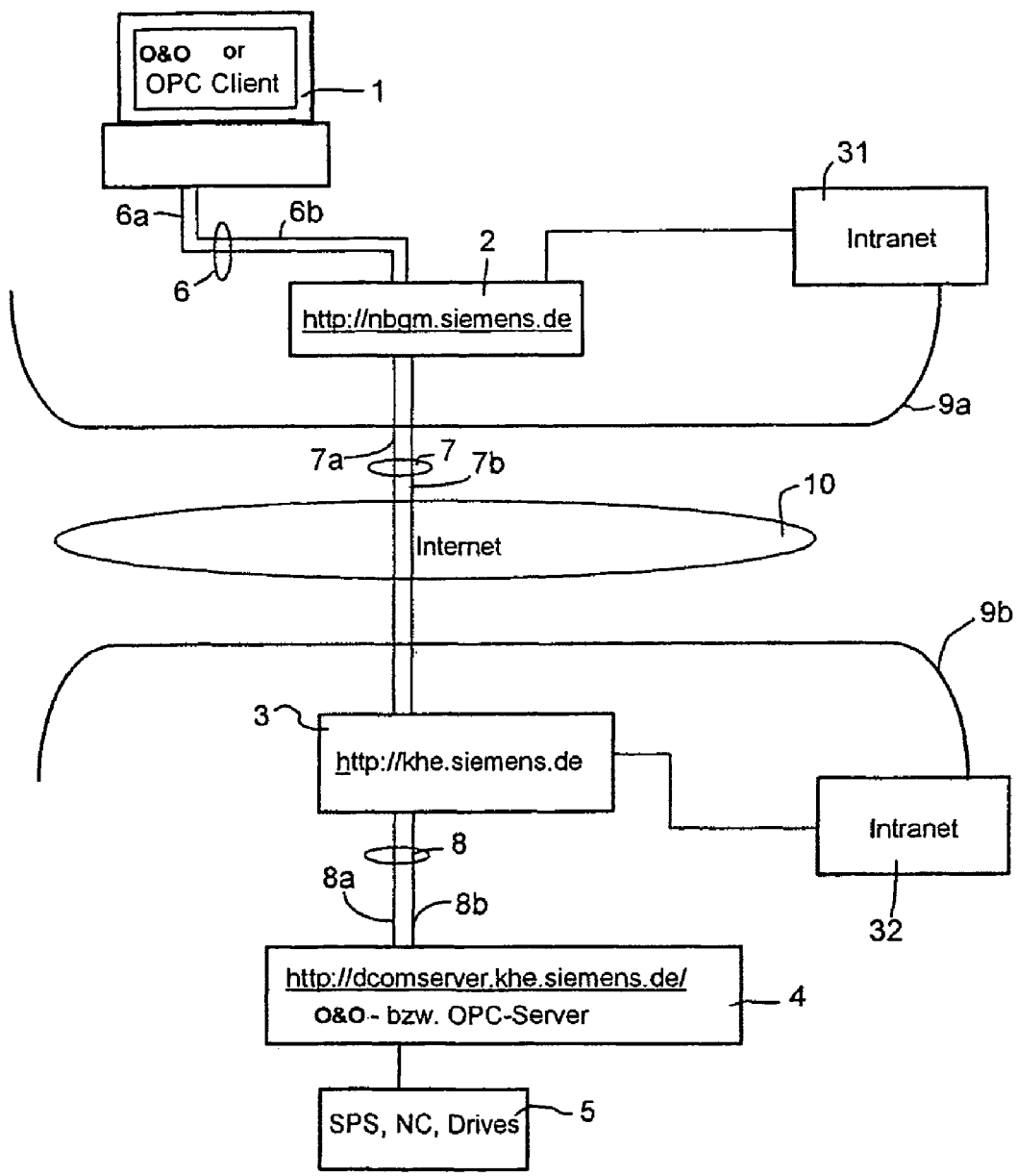
FIG. 1 shows a block circuit diagram of an exemplary embodiment of an automation system with Internet coupling for operation and observation using OPC technology.

Reference will now be made in detail to the preferred embodiments of the present invention, examples of which are illustrated in the accompanying drawings, wherein like reference numerals refer to like elements throughout.

FIG. 1 shows an exemplary embodiment of a system for operating and observing automation systems 5 which, for example, comprise programmable logic controllers (PLC), numerical controllers (NC) and/or drives. The system has an operating and observation system 1 (O&O client), which is coupled to a firewall computer 2 via an internal data network 6, for example an Ethernet. The O&O client 1 is simultaneously also the OPC client 1 in the example shown. The operating and observation system 1, which is also referred to in brief in the following text as the O&O system 1, is assigned a local intranet address, which does not have to be known in the Internet. The line 9a is used in FIG. 1 to indicate the firewall of the firewall computer 2, which surrounds the internal communication network 31 (=intranet 31) of the firewall server 2. The worldwide data communication network, the Internet, is identified by the reference symbol 10. The firewall computer 2 can be coupled to the Internet 10 via a connecting line 7, for example ISDN. The automation system 5 can be coupled to the Internet 10 via an Internet server 4, which serves as O&O server 4 for the automation system 5 and which, for example, has the Internet address dcom server.khe.siemens.de/, via a connecting line 8 and in each case via a second firewall computer 3. The O&O server 4 in the example shown is at the same time also the OPC server 4. The second firewall 9b surrounds the intranet 32 associated with the firewall computer 3. The firewall computer 3 is visible in the Internet 10, for example at the Internet address khe.siemens.de.

The data connection 6, 7, 8 between the client 1 and the server 4 is illustrated in the form of two subchannels in FIG. 1 in order to better illustrate and explain the respective transmission direction in the communication between client 1 and server 4 and vice versa. These subchannels contain a first transmission channel 6a, 7a, 8a, which symbolizes the communication direction from the client 1 to the server 4, and a second transmission channel 6b, 7b, 8b, which symbolizes the communication direction from the server 4 to the client 1. Physically, the two subchannels illustrated are a single transmission channel, that is to say for an answer from the server 4 to an associated query from the client 1 to the server 4, the same physical transmission channel is used.

In the following text, by using the establishment of a connection between the client 1 and the server 4 as an example, the establishment of a chronologically mutually independent, bidirectional transmitting and receiving connection between the client 1 and the server 4 via the Internet 10 is to be explained. For this purpose, use is made of an asynchronous method which makes it possible for the server 4 to be able to send data to the client 1 independently of actions of the client 1, which itself does not need to be visible in the Internet 10, that is to say does not have its own valid Internet address.

For this purpose, the client 1 sends a first request via the Internet 10 to the server 4 via the first transmission channel 6a, 7a, 8a, whereupon the server 4 reacts with an answer, a response as it is known, via the second transmission channel 6b, 7b, 8b. In order to avoid any chronological interruption to the response, and therefore any breakage to the data connection 6, 7, 8, the duration of the response is extended to be "infinitely" long. For this purpose, the system is, for example, notified that still further data is to be sent. This results in a permanently open data connection 6, 7, 8 via which the server 4, and therefore the automation system 5, at any time and independently of actions of the client 1, can send data asynchronously to the client 1 and therefore to the O&O system. In order to keep the data connection 6, 7, 8 open permanently, it is for example also possible to send dummy data from the server 4 to the client 1 at regular intervals, advantageously every 25-35 seconds.

Independently of this permanently open data connection 6, 7, 8, "normal" communication can also take place between the client 1 and the server 4 via the Internet 10, that is to say the client 1 sends a request to the server 4 via a new transmission channel and the server 4 answers this request with an appropriate response via this transmission channel. After the data has been transmitted, the new transmission channel is closed again. It is thus possible for the client 1 and also the server 4 to send and receive data bidirectionally chronologically independently of each other. In order to control the data transmission, a transport protocol, in particular an Internet transport protocol, is used. For this purpose, the Hypertext Transport Protocol (HTTP) is advantageously used as the transport protocol.

Figure 2:
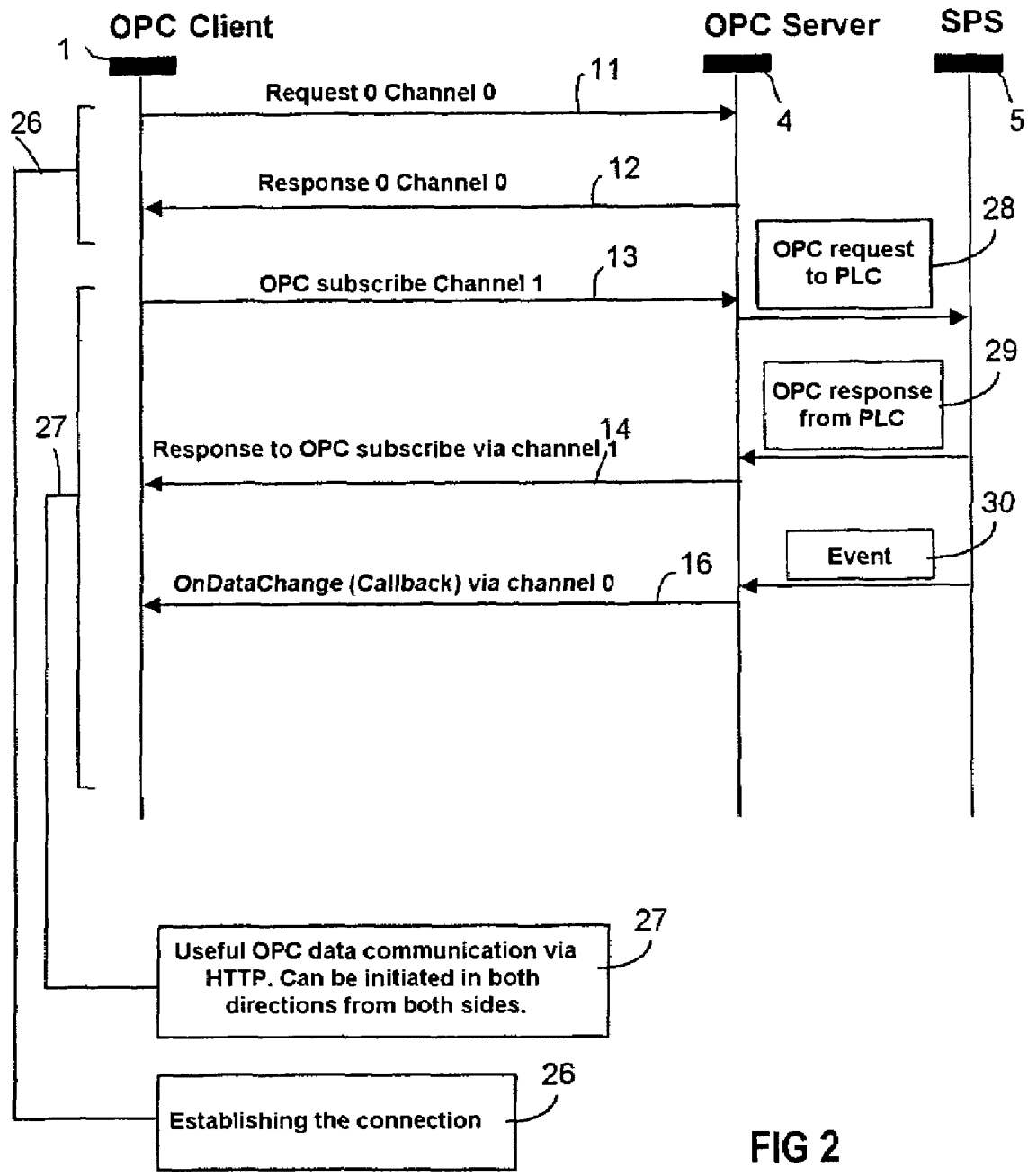
FIG. 2 shows a schematic, time-based illustration for possible useful OPC data communication between OPC client and automation system via an OPC server

FIG. 2 shows the chronological sequence of the establishment 26 of a permanently open data connection 6, 7, 8 between an OPC client 1 and an OPC server 4, to which an automation system 5, designated a PLC (=Programmable Logic Controller) as an example, is connected. The representation is made with the aid of UML notation (Unified Modeling Language). Furthermore, FIG. 2 shows the bidirectional communication which, after the data connection has been established, can be initiated by OPC client 1 and OPC server 4 chronologically independently of each other. The time sequence for establishing the data connection is as follows: the OPC client 1 makes a request 11 to the server 4, which answers the request with a response 12, this data connection not being cleared. For this purpose, the OPC client 1 is, for example, informed that still further data is to be dispatched, as a result of which this data connection is kept permanently open. In order to keep the data connection open permanently, it is also possible, for example, to send dummy data from the OPC server 4 to the OPC client 1 at regular intervals, in particular every 25-35 seconds, if no useful OPC data can be sent.

As a result, the OPC server 4 and the automation system 5 coupled to the OPC server 4 can send data to the OPC client 1 at any desired time, independently of the OPC client 1. Following the response 12 of the OPC server 4, for example the O&O system 1 places an OPC call, which is present in the OPC data format, on the automation system 5. To this end, the OPC client 1 converts the OPC call, which is present in the OPC data format, into an OPC subscribe in the Internet-compatible data format. The OPC client 1 sends the OPC subscriber 13 via a new data connection to the OPC server 4. The OPC server 4 converts the OPC subscribe in the Internet-compatible data format into the original OPC call in the OPC data format again. This call is passed on to the PLC 5 as an OPC request 28. The PLC sends back an OPC response 29 in the OPC data format to the OPC server 4, which converts the OPC response into an Internet-compatible data format and passes it on as a response 14 to the OPC client 1 (=synchronous behavior). This data connection is closed again after the data transmission has been carried out. The OPC client 1 converts the response in the Internet-compatible data format into the original OPC format again and passes it on to the O&O system 1 for further processing.

Independently of and in parallel with this, the OPC server 4 is able to communicate messages, alarms or else variable changes, for example, to the OPC client 1 via the permanently open data connection 12, as reactions to an event 30 in the PLC 5, without the OPC client 1 previously having made a request (=asynchronous OnDataChange or Callback 16). The OPC server 4 and the OPC client 1 in each case carry out the necessary conversions already described into the necessary data formats. This form of communication would not be possible in a "normal" HTTP connection.

The asynchronous Callback 16 is in particular also chronologically possible between a request and a response that has not yet been made.

The result overall is therefore useful OPC data communication 27 via the Internet in both directions, which can be initiated from both sides and is mutually chronologically independent. It therefore becomes possible to use existing communication paths of the Internet in the usual way even in the region of automation engineering, in particular the use of the OPC technology, for operating and observation purposes as an HMI interface (Human Machine Interface). One advantageous application considered is, for example, the operating and observation system WinCC from Siemens. The system and method permit the transmission of DCOM jobs from an OPC client 1 to the OPC server 4. The special feature in this case is that the method permits the OPC server 4 to send DCOM events to its OPC client 1, without the latter having a "true" address, that is to say one visible in the Internet. The OPC client 1 therefore does not need to be visible in the Internet, nor does it need to have installed an Internet Information Server (IIS). On the client side, no additional costs are therefore required, since Internet browsers such as the Internet Explorer from Microsoft or the Netscape Communicator from Netscape are available everywhere. Thus, no specific special solutions are required for data interchange between the automation system and O&O user, for example for alarm purposes.

Figure 3:
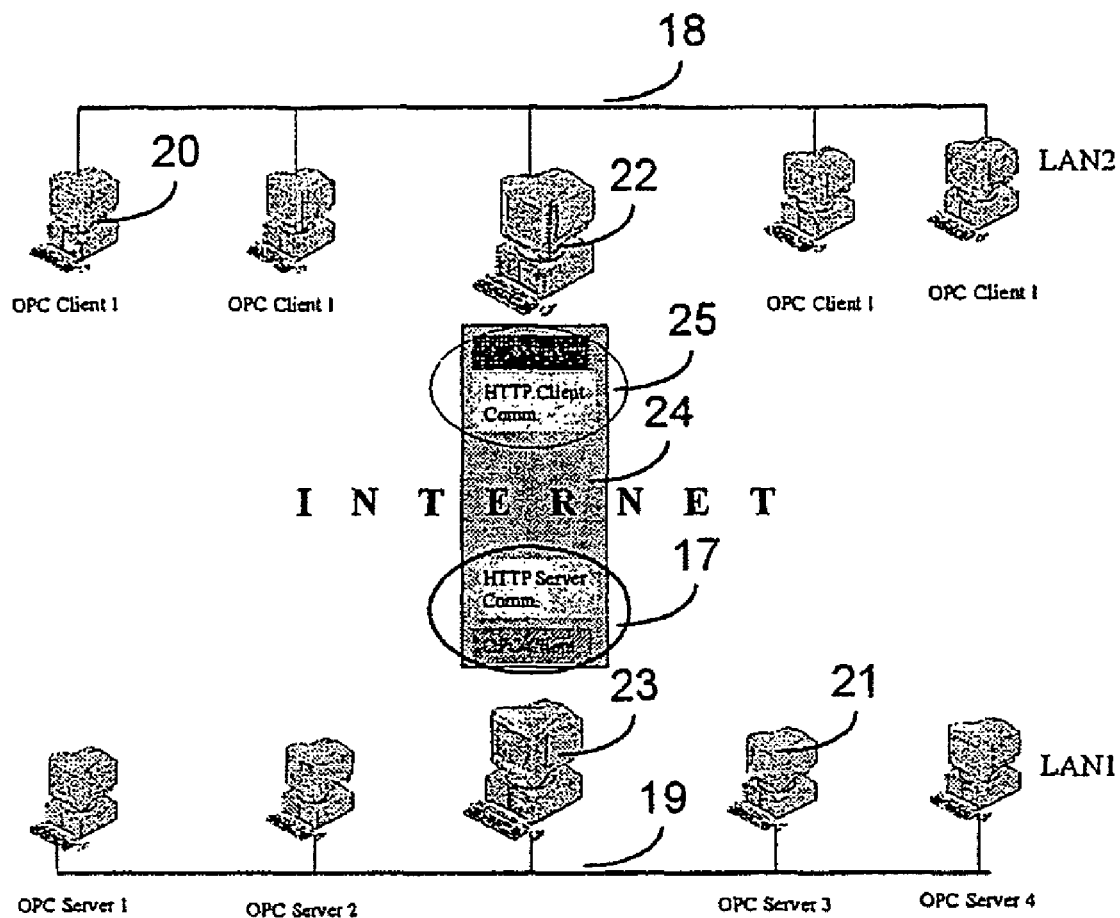
FIG. 3 shows an example of the OPC communication between network OPC clients and network OPC servers via the Internet.

FIG. 3 shows, by way of example, the OPC communication between network OPC clients and network OPC servers via the Internet.

A plurality of OPC clients, of which only one OPC client 20 has been shown for reasons of clarity, are networked with one another in a first local communication network 18, for example an Intranet or LAN. In a second local communication network 18 separate from the first, for example an Intranet or LAN, a plurality of OPC servers, of which only one OPC server 21 has been designated for reasons of clarity, are networked with one another.

In order to make OPC communication possible between the two local communication networks 18, 19 via the Internet 24, one computer 22 functions as an HTTP client 25. All the OPC calls from the OPC client of the first local communication network 18 are sent to the computer 22 and from there, via communication via the Internet 24, are transported to the HTTP server 17, located in the computer 23 in the second local communication network 19. In the view of the OPC client, therefore, the computer 22 behaves like an OPC server 25 and, at the same time, is an HTTP client 25 for the communication via the Internet 24. The HTTP server 17 passes on the received OPC calls to the associated OPC servers of the second local communication network 19. Thus, in the view of the OPC server, the computer 23 behaves like an OPC client 17 and, at the same time, is an HTTP server 17 for the communication via the Internet 24.

This communication via the Internet 24 is carried out by the bidirectional transmitting and receiving connection described in FIG. 2, capable of initiation from both sides and mutually chronologically independent, between the HTTP client 25 or OPC server 25 and the HTTP server 17 or the OPC client 17. Of course, the HTTP client 25 or OPC server 25 and the HTTP server 17 or OPC client 17 in each case carry out the necessary conversions already described in relation to FIG. 2 into the necessary data formats.

In summary, a system and a method transmit OPC data via data networks, in particular the Internet, in particular OPC data for operating and observing an automation system 5. For a bidirectional useful data connection even behind firewalls via the Internet in both directions, even from an OPC client 1 which is not visible as a server in the Internet, a method and a system are proposed in which, from a first data processing device of an OPC client 1, in particular from an operating and observation system 1, via a data connection 6, 7, 8, in particular an Internet connection, a first connection request to establish a first transmission channel 6a, 7a, 8a is sent to an O&O or OPC server 4 of an automation system 5. A response to this is made via a second transmission channel 6b, 7b, 8b. A chronologically unlimited useful duration of the data connection 6, 7, 8 is ensured in that, in order to maintain the data connection 6, 7, 8, for example even when there is no useful OPC data present, dummy data is transmitted or, that information is sent to the OPC client 1 which informs the client 1 that transmission of useful OPC data is still intended. This results in a permanently open data connection 6, 7, 8 via which the O&O or OPC server 4, and therefore the automation system 5, at any time and independently of actions of the OPC client 1, can send data asynchronously to the OPC client 1 and therefore to the O&O system 1.

The invention has been described in detail with particular reference to preferred embodiments thereof and examples, but it will be understood that variations and modifications can be effected within the spirit and scope of the invention.

The invention claimed is:

1. A method for transmitting OPC (OLE for process control) data via a data network, comprising:
    sending a first connection request for establishing at least one first transmission channel, the first connection request being sent from an OPC client via a data connection to an OPC server;
    maintaining a data transmission channel permanently open between the OPC server and the OPC client, the data transmission channel being maintained permanently open by transmitting dummy data when there is no useful OPC data present; and
    sending, at any desired time and independently of the actions of the OPC client, OPC data from the OPC server to the OPC client,
wherein in order to maintain the data transmission channel permanently open to permanently allow quantities of data up to a defined size to be transmitted from the OPC server to the OPC client, the OPC server sends a new connection request to the OPC client before the quantity of data reaches the defined size, and then the OPC client sends a new connection request to the OPC server for establishing at least one new transmission channel.

2. The method as claimed in claim 1, wherein the dummy data is sent from the OPC server to the OPC client.

3. The method as claimed in claim 1, wherein when useful OPC data is not present, dummy data is transmitted from the OPC server to the OPC client every 25-35 seconds.

4. The method as claimed in claim 1, wherein in order to maintain the data transmission channel permanently open, the OPC server sends to the OPC client information which informs the OPC client that a transmission of data is intended.

5. The method as claimed in claim 1, wherein the defined size of data to be transmitted is 15-25 MB.

6. The method as claimed in claim 1, wherein an Internet transport protocol, used to control the data transmission.

7. The method as claimed in claim 6, wherein the Internet transport protocol is a Hypertext Transport Protocol.

8. The method as claimed in claim 1, further comprising operating and observing an automation system via the data network.

9. The method as claimed in claim 1, wherein
    the data network is the Internet,
    the OPC data is being sent via the Internet from a transmitting station to a receiving station,
    before being sent, the OPC data is converted into an Internet-compatible data format, and following transmission, the data received in the Internet-compatible data format is converted into OPC data again by the receiving station.

10. The method as claimed in claim 1, wherein the OPC client is not visible in the data network.

11. The method as claimed in claim 1, wherein the OPC client does not have an Internet Information Server installed.

12. The method as claimed in claim 1, wherein
the OPC client has an operating and observation system,
the operating and observation system of the OPC client initiates establishment of the at least one first transmission channel as a distributed object,
a connection to the automation system is established via at least one of a DCOM server and an OPC server.

13. The method as claimed in claim 1, wherein the data network is an asynchronous data network.

14. A system for transmitting OPC (OLE for process control) data via a data network, comprising:
a data processing device of an OPC client, the data processing device being coupled to the data network to establish a data connection to an OPC server, the data connection being in the form of a first transmission channel; and
a data connection maintenance unit to permanently maintain open a data transmission channel to the OPC client for the OPC server to send, at any desired time and independently of the actions of the OPC client, OPC data to the OPC client via the data network the data connection maintenance unit enabling data up to a defined size to be transmitted from the OPC server to the OPC client and having a transmission unit to transmit dummy data when there is no useful OPC data present, wherein before the defined quantity of data has been reached, the data connection maintenance unit sends a requirement for a new connection request to the OPC client, and in response to the requirement received from the data connection maintenance unit, the OPC client sends a new connection request to establish at least one new transmission channel to the OPC server.

15. The system as claimed in claim 14, wherein the data connection maintenance unit informs the OPC client that a transmission of data is intended.

16. The system as claimed in claim 14, wherein the system controls data transmission using an Internet transport protocol.

17. The system as claimed in claim 14, wherein the system controls data transmission using a Hypertext Transport Protocol.

18. The system as claimed in claim 14 further comprising an operating and observing system to operate and observe an automation system via the data network.

19. The system as claimed in claim 18, wherein
the operating and observation system is provided at the OPC client,
the operating and observing system initiates establishment of the first transmission channel as a distributed object, and
a connection to the automation system is established via a DCOM server or an OPC server.

20. The system as claimed in claim 14, wherein
OPC data is sent via the internet from a transmitting station to a receiving station,
before transmission, the OPC data is converted into an Internet-compatible data format, and
after reception, the Internet-compatible data is converted into the OPC data by the receiving station.

21. The system as claimed in claim 20, wherein the transmitting station is the OPC client or the OPC server.

22. The system as claimed in claim 20, wherein the dummy data is sent from the OPC server to the OPC client.

23. The system as claimed in claim 14, wherein the data network is an asynchronous data network.

* * * * *